United States Patent [19]
Takatori et al.

[11] Patent Number: 5,577,037
[45] Date of Patent: Nov. 19, 1996

[54] METHOD OF PROCESSING INCLUSIVELY STM SIGNALS AND ATM SIGNALS AND SWITCHING SYSTEM EMPLOYING THE SAME

[75] Inventors: Masahiro Takatori, Hachioji; Yukio Nakano, Zama; Yoshihiro Ashi, Yokohama, all of Japan

[73] Assignee: Hitachi, Ltd., Tokyo, Japan

[21] Appl. No.: 213,761

[22] Filed: Mar. 16, 1994

[30] Foreign Application Priority Data

Mar. 18, 1993 [JP] Japan .................. 5-058942

[51] Int. Cl.⁶ .................................. H04L 12/56
[52] U.S. Cl. .......................... 370/60.1; 370/94.2
[58] Field of Search ................... 370/58.1, 58.2, 370/58.3, 60, 60.1, 61, 94.1, 66, 68, 63, 94.2

[56] References Cited

U.S. PATENT DOCUMENTS

| | | | |
|---|---|---|---|
| 4,788,680 | 11/1988 | Kikuchi et al. | 370/68 |
| 4,926,416 | 5/1990 | Weik | 370/60.1 |
| 5,124,977 | 6/1992 | Kozaki et al. | 370/60 |
| 5,130,979 | 6/1992 | Ohtawa | 370/68 |
| 5,144,619 | 9/1992 | Munter | 370/60.1 |
| 5,168,492 | 12/1992 | Beshai et al. | 370/60 |
| 5,237,564 | 8/1993 | Lespagnol et al. | 370/58.1 |
| 5,280,475 | 1/1994 | Yanagi et al. | 370/60 |
| 5,287,348 | 2/1994 | Schmidt et al. | 370/60.1 |
| 5,351,238 | 9/1994 | Ashi et al. | 370/68 |

OTHER PUBLICATIONS

"Application of the Multipath Self–Routing Switch in a Combined STM/ATM Cross–Connect System", ISS '92, Oct. 1992, vol. 1, C3.1, pp. 324–328 (see Specification p. 1).

Primary Examiner—Douglas W. Olms
Assistant Examiner—Chau T. Nguyen
Attorney, Agent, or Firm—Kenyon & Kenyon

[57] ABSTRACT

A method of processing inclusively STM signals and ATM signals is provided in which an address in a data memory, in which an output signal is temporarily stored for switching of the STM signals, is made different from that in the data memory, in which an input signal is temporarily stored for switching of the ATM signals, and the address which is to be given to the STM signal is registrated in a memory (an address control memory) to be given to the STM signal periodically, while with respect to the address which is to be given to the ATM signal, the unused address is stored in a memory (an idle address FIFO memory), and when storing the ATM signal in the data memory, the unused address is read out from the idle address FIFO memory to be used successively.

14 Claims, 15 Drawing Sheets

FIG. 6

| TIME SLOT NUMBER | |
|---|---|
| 1 | ADDRESS FOR STM SIGNAL |
| 2 | ATM SIGNAL DESIGNATOR |
| 3 | ATM SIGNAL DESIGNATOR |
| 4 | ADDRESS FOR STM SIGNAL |
| 5 | ADDRESS FOR STM SIGNAL |
| 6 | ADDRESS FOR STM SIGNAL |
| 7 | ATM SIGNAL DESIGNATOR |

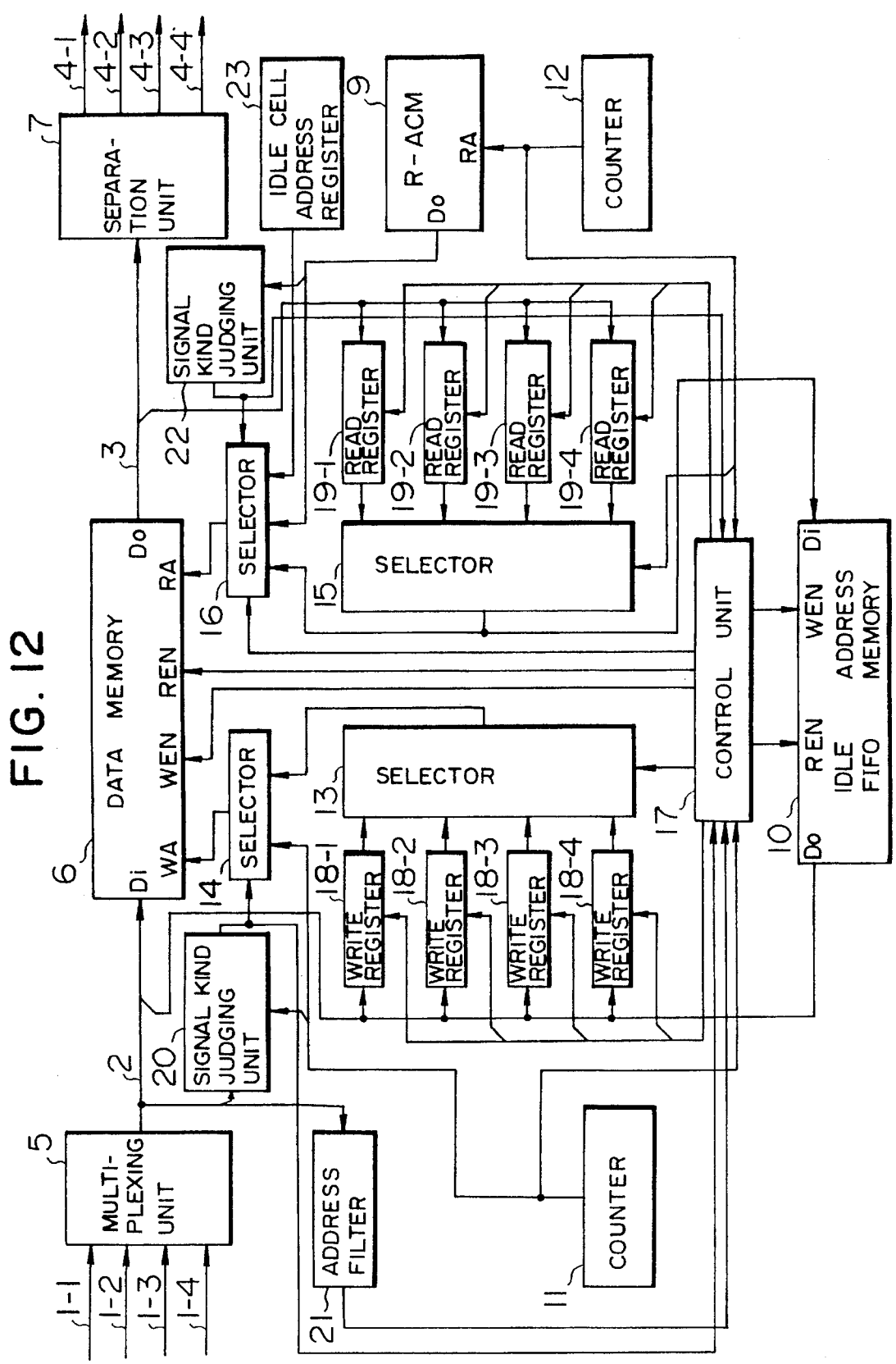

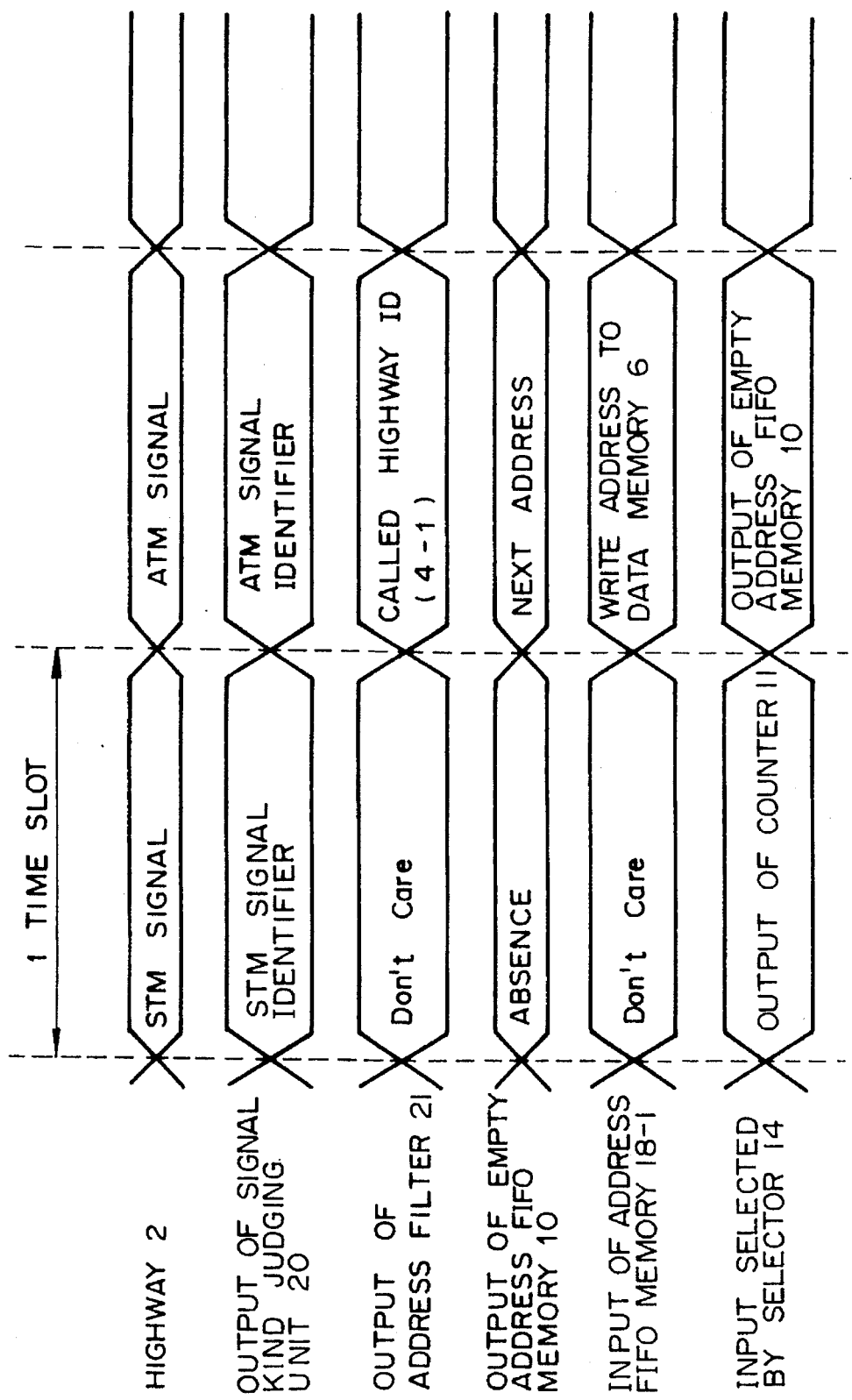

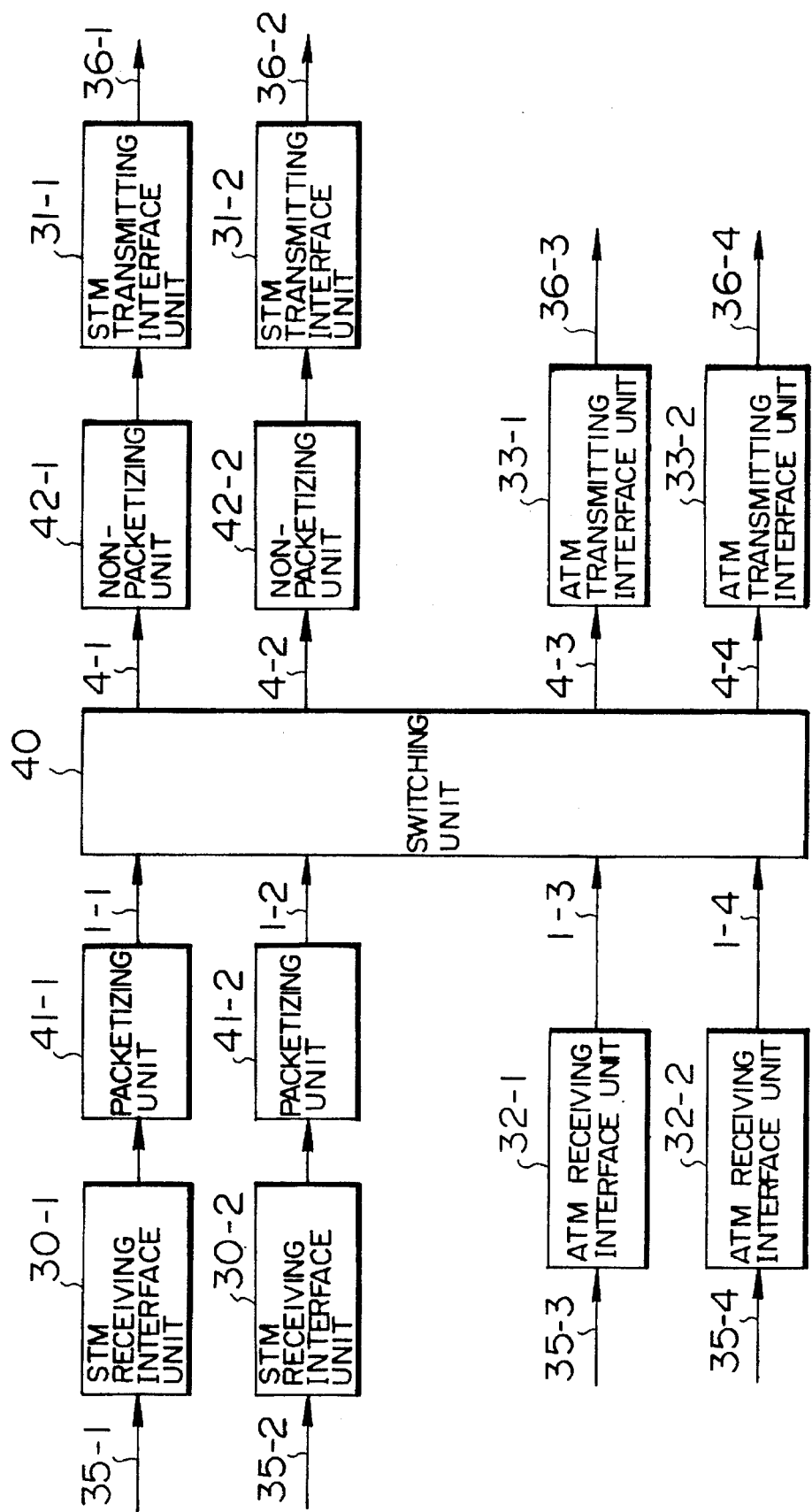

METHOD OF PROCESSING INCLUSIVELY STM SIGNALS AND ATM SIGNALS AND SWITCHING SYSTEM EMPLOYING THE SAME

BACKGROUND OF THE INVENTION

The present invention relates, in general, to a transmission system or an exchange used to exchange Synchronous Transfer Mode (hereinafter, referred to as "STM" for short, when applicable) signals and Asynchronous Transfer Mode (hereinafter, referred to as "ATM" for short, when applicable) signals, and more particularly to a method of processing inclusively the STM signals and the ATM signals, and a switching system employing the same.

Heretofore, as for such a technology, for example, as described in the paper of B. Pauwels et al.: "APPLICATION OF THE MULTIPATH SELF-ROUTING SWITCH IN A COMBINED STM/ATM CROSS-CONNECT SYSTEM", ISS 92, Oct. 1992, Vol. 1, C3.1, there is known a system wherein an STM signal is first of all packetized and then is processed in the similar manner to that in an ATM signal. A configuration of a switch according to that system is shown in FIG. 17. In the figure, the reference numerals 1-1 to 1-4 designate input highways, the reference numerals 4-1 to 4-4 designate output highways, and the reference numerals 35-1 to 35-4 and 36-1 to 36-4 designate transmission lines, respectively. As shown in FIG. 17, in this system, the STM signals which have been received by STM receiving interface units 30-1 and 30-2 are first of all packetized in respective packetizing units 41-1 and 41-2. During the packetizing operation, the information which is required for the switching operation is added as a header to the associated STM signal. In addition, in ATM receiving interface units 32-1 and 32-2 as well, the information required for the switching operation is added as a header to the associated ATM signal. A switching unit 40 operates to switch both the STM signals which have been packetized and the ATM signals, in accordance with the information which has been written to the respective headers. Thereafter, the STM signals are restored to their original signal forms in unpacketizing units 42-1 and 42-2, respectively, and then are output to the output highways via STM transmitting interface units 31-1 and 31-2, respectively. The ATM signals are output to ATM transmitting interface units 33-1 and 33-2, respectively, after the switching operation, and then are output to the output highways, respectively.

In this way, the STM signals are processed in a manner similar to that for processing the ATM signals, thereby realizing the inclusive switching of both the STM signals and the ATM signals.

In the above-mentioned prior art, the STM signals are temporarily stored to packetize them. Therefore, the time delay associated therewith increases necessarily. In addition, in the case where the STM signals are packetized to be exchanged, there is the possibility that the STM signals may be abandoned in the switching unit. In other words, in the case of exchange of the STM signals, it is necessary to secure the time slots in the highways on the input and output sides of the switching unit and to secure an area (addresses) for storing the STM signals in the data memory of the switching unit. However, in the above-mentioned prior art, those conditions can not be fulfilled.

SUMMARY OF THE INVENTION

In order to attain the above-mentioned object, the present invention is designed in such a way that the addresses in the data memory for storing temporarily the input signals, i.e., the STM signals are different from those in the data memory for storing temporarily the other input signals, i.e., the ATM signals. At the same time, the addresses which are to be given to the STM signals are registrated in the memory and are periodically given to the STM signals. With respect to the addresses which are to be given to the ATM signals, the addresses other than the addresses (i.e., the above-mentioned addresses registrated in the memory), which have been given to the STM signals, out of the addresses in the data memory are stored in a memory (an idle address FIFO memory). Then, in the case where the ATM signals are stored in the above-mentioned data memory, the unused addresses are read out from the above-mentioned idle address FIFO memory to be utilized successively.

The description will hereinbelow be given with respect to the functions of the present invention with reference to FIG. 1. FIG. 1 is a functional block diagram showing a configuration of a switch of having four inputs and four outputs.

In the figure, the reference numerals 1-1 to 1-4 designate input highways, the reference numerals 2 and 3 designate highways, the reference numerals 4-1 to 4-4 designate output highways, the reference numeral 5 designates a multiplexing unit, and the reference numeral 7 designates a separation unit.

The switch shown in FIG. 1 includes a data memory 6, a write address control memory (hereinafter, referred to as "a W-ACM" for short, when applicable) 8, and a read address control memory (hereinafter, referred to as "an R-ACM" for short, when applicable) 9. In addition, sets of two kinds of registers (write registers 18-1 to 18-4 and read registers 19-1 to 19-4) corresponding to the associated highways are provided by the same number (i.e, four sets) as that of the output highways. Further, in this switch, the data output of the idle address FIFO memory 10 are connected to the input terminals of the write registers 18-1 to 18-4 and the data input terminal of the data memory 6, the output terminals of the plurality of write registers 18-1 to 18-4 are connected to a selector 13 which operates to receive the destination input highway number of the arrived signal as a selective input, and the output of the W-ACM 8 and the output of the selector 13 are connected to the write address terminal of the data memory 6 through a selector 14.

In the case of exchange of the STM signals, it is required to secure the time slots in the highways on the input and output sides of this switch and to secure the area (the addresses) for storing the STM signals in the data memory 6 of the switch. Therefore, in the switching system, as well, for managing both the STM signals and the ATM signals, the STM signals are not simply packetized to be processed in the similar manner to that in the ATM signals, but the time slots and the addresses of the data memory 6 need to be previously secured for the STM signals.

In the present invention, firstly, the addresses of the data memory 6 for the STM signals are secured and those addresses are managed by both the W-ACM 8 and R-ACM 9. That is, the information of the relationship between the time slots, out of the time slots of the input side highway 2, for carrying the STM signals and the addresses of the data memory 6 for storing the STM signals corresponding to those time slots is previously stored in the W-ACM 8. In other words, when storing the STM signal in the data memory 6, the address in which the STM signal is to be stored is read out from the W-ACM 8 and then the STM signal is stored in the area of the data memory 6 corresponding to that address, the. In addition, likewise, in the output side highway 3, the information of the relationship between the time slots, out of the time slots of the output side highway 3, for outputting the STM signals and the addresses, in the data memory 6, of the STM signals which are to be output to the time slots is previously stored in the R-ACM 9. Then, when reading out the STM signal from the data memory 6, the read address is read out from the R-ACM 9, and from the area of the data memory 6 corresponding thereto, the STM signal is read out to be output to the highway 3. By adopting this means, it is possible to exchange the STM signals.

On the other hand, the processing for the ATM signals is performed by using the area, out of the area of the data memory 6, other than the area which were assigned to the STM signals. First, the addresses (which are not being used at present) other than the addresses which were assigned to the STM signals are previously stored in the idle address FIFO memory 10. Next, the addresses are output from the idle address FIFO memory 10 and then are written to the write address registers 18-1 to 18-4. When writing the ATM signal to the data memory 6, an address filter 21 detects the output highway ID of the data which was written in to the header of the ATM signal, and the write address is obtained from the write register corresponding to that output highway. Next, the address (the next address) is read out from the idle address FIFO memory 10, and then the address thus read out to which the ATM signal is to be stored is written to the data memory 6. Then, the next address is written to the above-mentioned write register. When reading out the ATM signal from the data memory 6, the read address is obtained from the read register to read out the ATM signal, and then that read address is returned to the idle address FIFO memory 10. Then, the next address which was read out is written together with the ATM signal to the above-mentioned read register. In this way, by using successively the addresses for the ATM signals, the ATM signal can be written to the area in the data memory 6 as long as an empty area is present in the data memory 6.

Next, a description will hereinbelow be given with respect to the case where the STM channel is newly set. In this case, the address in the data memory 6 needs to be newly assigned to the STM signal. Therefore, the address which was used for the reading operation just after reading out the ATM signal from the data memory 6 is not written to the idle address FIFO memory 10, but is stored in the area in the W-ACM 8 corresponding to the time slot in the highway 2 of the STM signal which is to be newly set. In addition, that address is also stored in the area in the R-ACM 9 corresponding to the time slot in the highway 3 of the STM signal which is to be newly set. In this way, the area in the data memory 6 is assigned to the STM signal, thereby enabling the channel for the STM signal to be newly set.

Next, the description will hereinbelow be given with respect to the case where one STM channel is removed. In this case, the address in the data memory 6 which was assigned to the STM signal is opened to the ATM signal. Therefore, the addresses for the STM signal in the W-ACM 8 and R-ACM 9 which are to be removed are fetched to be stored in the idle address FIFO memory 10. In this way, the area in the data memory 6 which was assigned to the STM signal is provided for the ATM signal.

Incidentally, in the figure, other units are as follows. That is, the reference numerals 11 and 12 designate counters, the reference numerals 15 and 16 designate selectors, the reference numeral 17 designates a control unit, the reference numerals 20 and 22 designate units for judging the kind of the signal, and the reference numeral 23 designates an empty cell address register.

As shown in the above-mentioned processing, the addresses given to the STM signals and given to the ATM signals are separately managed, whereby both the STM signals and the ATM signals can be exchanged by the single system.

BRIEF DESCRIPTION OF THE DRAWINGS

FIG. 6 is a diagram showing an example of the contents of the W-ACM 8 and R-ACM 9.

FIG. 12 is a functional block diagram showing a configuration of a second embodiment of the present invention.

FIG. 16 is a timing chart (4) useful in explaining the operation of writing the data to the data memory 6. and FIG. 17 is a block diagram showing a configuration of the prior art switching system.

DETAILED DESCRIPTION

Figure 2:
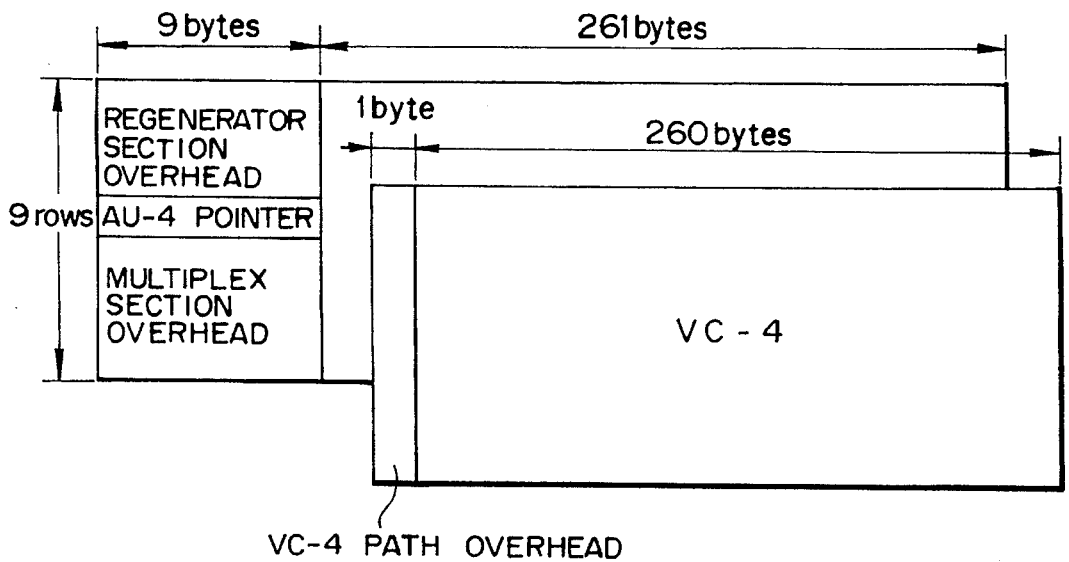
FIG. 2 is a diagram showing a form of an STM-1 signal which is determined in the CCITT recommendation.
Figure 3:
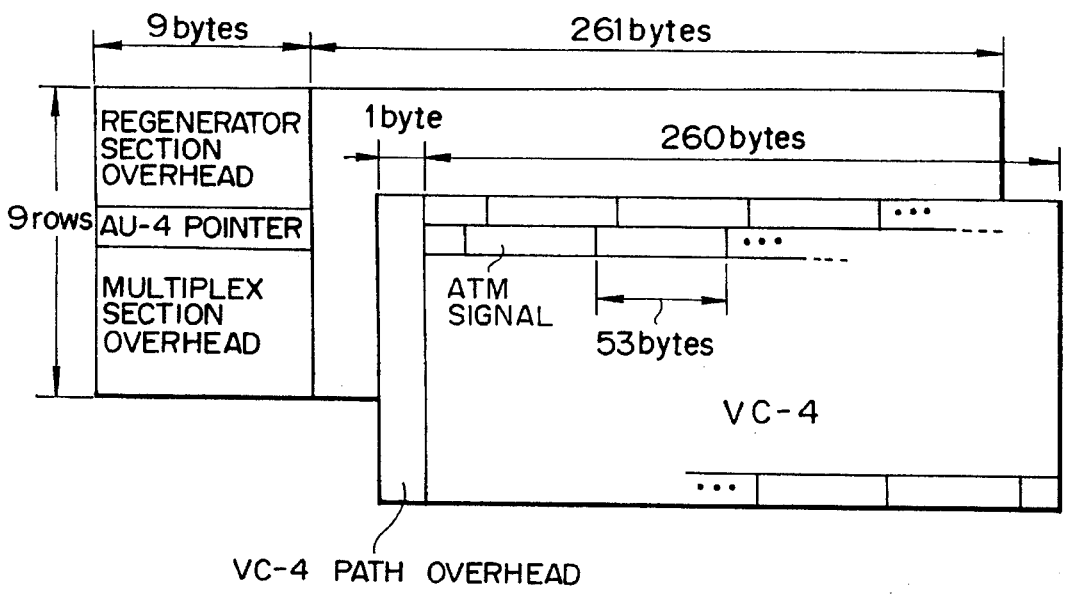
FIG. 3 is a diagram showing a form of an ATM signal on a transmission line.
Figure 4:
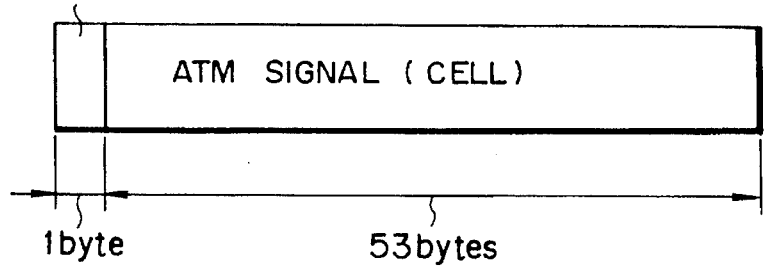
FIG. 4 is a diagram showing a form of the ATM signal in the system.

Prior to the description of a first embodiment of the present invention, the description will hereinafter be given with respect to the signals, which are used in the present invention, with reference to FIGS. 2, 3 and 4. FIG. 2 is a diagram showing a form of an STM-1 signal which is determined in the CCITT recommendation G.707,708 and 709. This STM-1 signal includes an AU-4 Pointer. Although the STM-1 signal is in a state shown in FIG. 2 on the transmission line, it is divided in 54 bytes in the system to be processed. Next, FIG. 3 is a diagram showing a form of an ATM signal. In FIG. 3, there is shown a method of mapping the ATM signal on the STM-1 signal, and the ATM signal is transmitted in this state on the transmission line. In addition, the ATM signal is fetched from the STM signal in the system. Then, as shown in FIG. 4, 1 byte is added to the ATM signal so as for the ATM signal to have the 54 bytes length.

Figure 1:
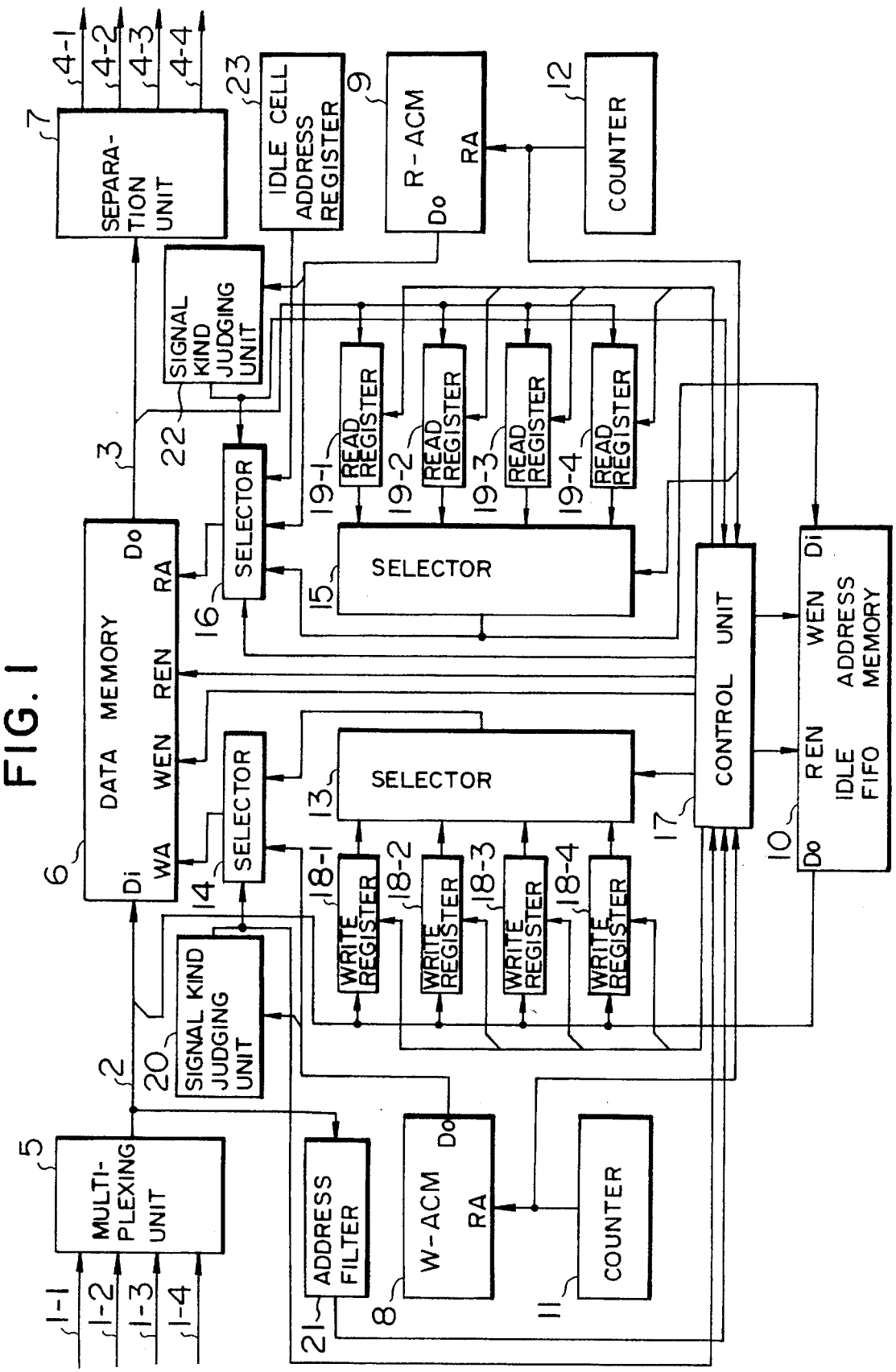
FIG. 1 is a functional block diagram showing a configuration of a first embodiment of the present invention.

Next, a configuration of a switching unit in a first embodiment of the present embodiment is shown in FIG. 1. The switch shown in FIG. 1 is of a four inputs and four outputs type. The signals which have been input from a plurality of input highways are subjected to the time-division multiplexing in a multiplexing unit 5, the signals which have arrived at a data memory 6 are then written to the data memory 6, the signals thus written are then read out in a suitable order from the data memory 6 and then are separated in a separation unit 7 to be divided among a plurality of output highways, whereby the switching operation is carried out. On the input side of the data memory 6, an address control memory (W-ACM) 8 for the STM signals is provided. In addition, the sets of two kinds of registers (write registers 18-1 to 18-4 and read registers 19-1 to 19-4) corresponding to the associated output highways are provided by the same number (i.e., four sets) as that of the output highways. Further, the data output of an idle address FIFO memory 10 is connected to the input terminals of the write registers 18-1 to 18-4 and the data input terminal of the data memory 6, the output terminals of the plurality of write registers 18-1 to 18-4 are connected to a selector 13 which operates to receive the destination output highway number of the arrived signal as a selective input, and the output of the W-ACM 8 and the output of the selector 13 are connected to the write address terminal of the data memory 6 through a selector 14. In this connection, the write registers 18-1 to 18-4 correspond to the output highways 4-1 to 4-4, respectively. In addition, the read registers 19-1 to 19-4 correspond to the output highways 4-1 to 4-4, respectively.

On the other hand, on the output side of the data memory 6, a third memory (an address control memory: R-ACM) 9 is provided. In addition, the data output terminal of the data memory 6 is connected to the input terminals of the read registers 19-1 to 19-4, the output terminals of the plurality of read registers 19-1 to 19-4 are connected to a selector 15 which operates to receive, as a selective input, the output of a counter 12 which operates to generate the read timing for every output highway, the output of the selector 15 and the output of the R-ACM 9 are connected to the read address terminal of the data memory 6 through a selector 16, and the output of the selector 15 is also connected to the data input terminal of the idle address FIFO memory 10. Now, in the figure, the reference symbols Di and Do designate the data input terminal and the data output terminal, respectively. In addition, the reference symbols WA and RA designate the write address terminal and the read address terminal of the data memory 6, respectively, and the reference symbols WEN and REN designate a write enable terminal and a read enable terminal of the data memory 6, respectively.

Figure 5:
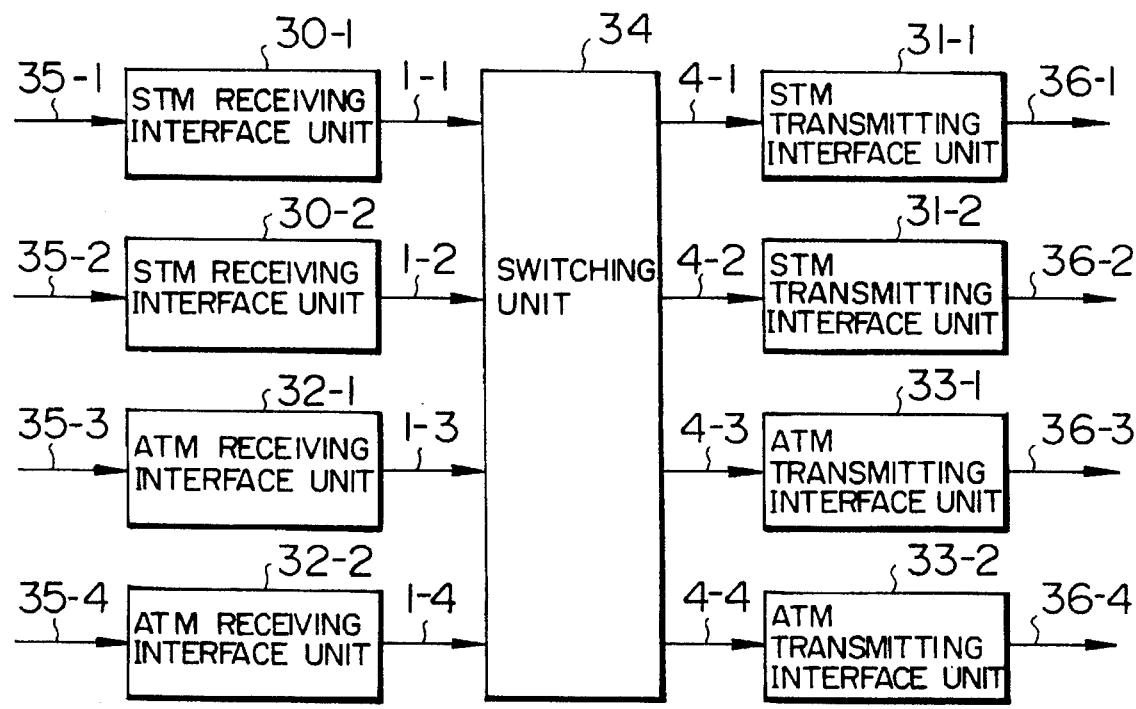
FIG. 5 is a block diagram showing a configuration of the whole system.

Next, the configuration of the system is shown in FIG. 5. In FIG. 5, the STM signals are respectively received by STM receiving interface units 30-1 and 30-2 to be divided in 54 bytes and then are output to a switching unit 34. In addition, the ATM signals are respectively received, in the state as shown in FIG. 3, by ATM receiving interface units 32-1 and 32-2. In the ATM receiving interface units 32-1 and 32-2, each of the received ATM signals is converted into a signal having the form shown in FIG. 4 and then is output to the switching unit 34.

The switching unit 34 has the configuration shown in FIG. 1. First, the description will hereinbelow be given with respect to the operation of writing the data to the data memory 6. The STM signal appears periodically on the highway 2. Therefore, in correspondence to the order within the period of the time slot (54 bytes length in the present embodiment) in the highway 2, the address value which will be given when writing the STM signal, which is to be transmitted in the time slot, to the data memory 6 is previously stored in the W-ACM 8. The configuration of the W-ACM 8 is shown in FIG. 6. As shown in FIG. 6, for the time slots corresponding to the signals other than the STM signals, the data other than the address values is stored. For example, the data may be set to a value larger than the maximum value of the address which is present in the data memory 6. The W-ACM 8 utilizes the output of the counter 11 as a read address. The output value of the counter 11 corresponds to the above-mentioned period.

In the case where the STM signal has arrived at the data memory 6, the output of the W-ACM 8 is the address value. A unit 20 for judging the kind of the signal detects on the basis of the output of the W-ACM 8 that the arrived signal is the STM signal, and commands the selector 14 to select the output of the W-ACM 8. Then, the selected output of the W-ACM 8 is input to the write address terminal of the data memory 6, and the arrived STM signal is stored in the area in the data memory 6 corresponding to that address.

The description will hereinbelow be given with respect to the case of the time slots corresponding to the signals other than the STM signals. In this case, the signal kind judging unit 20 analyzes the output of the W-ACM 8 so that the signal representing that the time slot of interest is the time slot for ATM is output to the selector 14, and then the selector 14 selects the output of the selector 13. In addition, an address filter 21 checks the header of the ATM signal. The output highway to which the ATM signals are to be output (the output highway number) are recorded in the headers of the ATM signals in the above-mentioned ATM receiving interface units 32-1 and 32-2 (refer to FIG. 4). The address filter 21 checks that header portion of the ATM signal, and as a result, it detects to which output highway the ATM signal of interest is to be output, and then transmits the data relating to the output highway to which the ATM signal is to be output to a control unit 17. The control unit 17 reads out the write address from the write register corresponding to that output highway to the data memory 6 and then gives it to the write address terminal of the data memory 6 via both the selectors 13 and 14. Now, that write address is previously input from the idle address FIFO memory 10. Then, the control unit 17 reads out one idle address from the idle address FIFO memory 10 and stores that idle address together with the ATM signal in the data memory 6. In addition, the control unit 17 also writes that idle address to the write register corresponding to the output highway which is to output the corresponding ATM signal of and updates the contents of that write register. Incidentally, in the case where that ATM signal corresponds to the empty cell (the idle cell) or the idle address FIFO memory 10 is empty, no data is written to the data memory 6.

Figure 7:
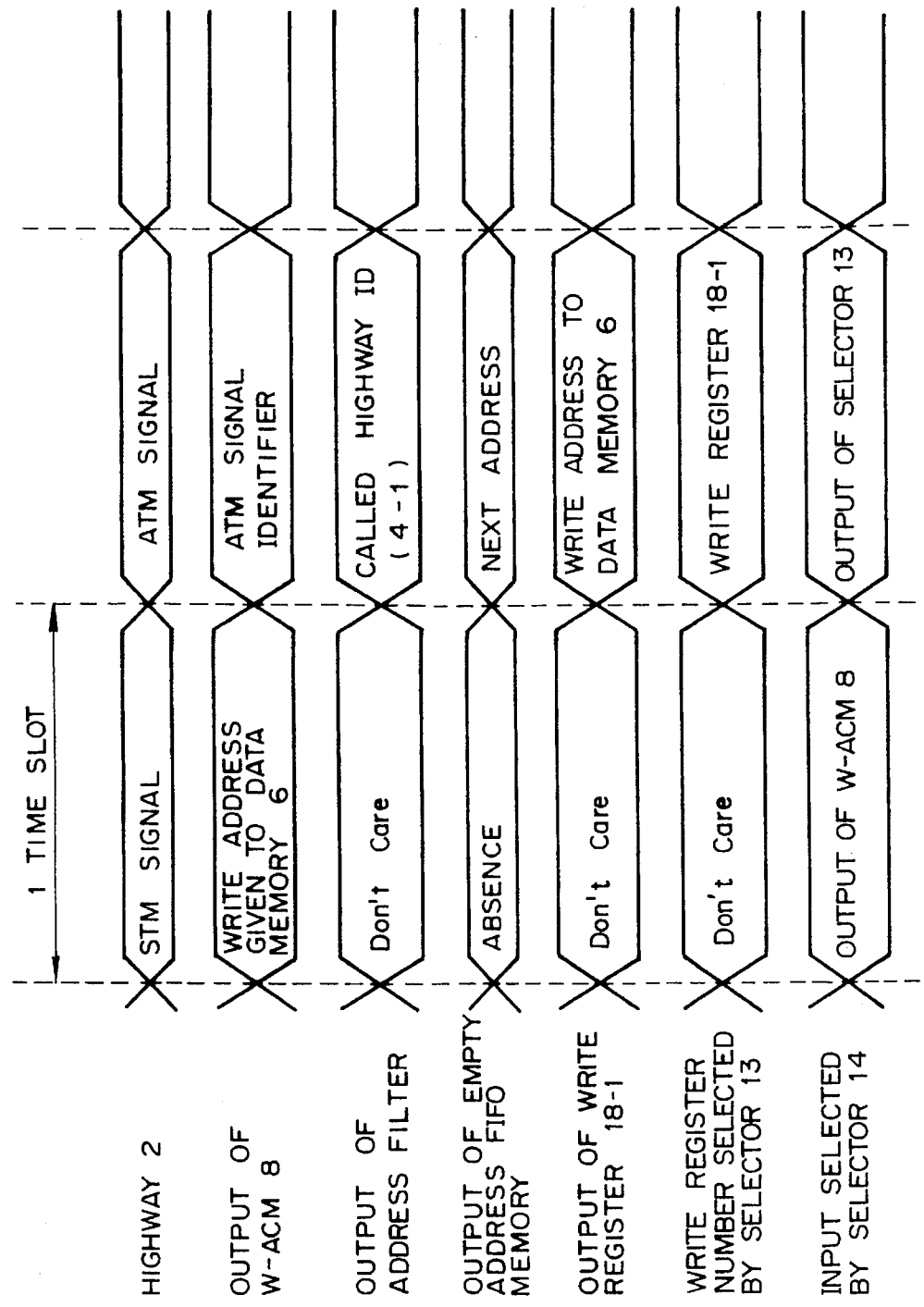
FIG. 7 is a timing chart (1) useful in explaining the operation of writing the data to the data memory 6.

A timing chart of the write side operation is shown in FIG. 7. FIG. 7 shows the operation in the case where the STM signal and the ATM signal arrive successively at the data memory 6. In the figure, it is assumed that the ATM signal is output to the output highway 4-1. As shown in FIG. 7, when the STM signal has arrived at the data memory 6, the output of the W-ACM 8 is given to the write address terminal of the data memory 6. On the other hand, when the ATM signal has arrived at the data memory 6, the output of the write register (the write register 18-1 in the present embodiment) corresponding to the output highway (the output highway 4-1 in the present embodiment), which is to output the ATM signal of interest, is given to the write address terminal of the data memory 6.

Next, the reading operation will hereinbelow be described. On the read side, the counter 12 reads out the read addresses from the R-ACM 9 in correspondence to the time slots in the output highways 4-1 to 4-4. The configuration of the R-ACM 9 is also the same as that of the W-ACM 8. That is, in the case where the STM signal is output in that time slot, the address in the data memory 6 is already stored. In the case where the signal which is to be output is the STM signal, the signal kind judging unit 22 analyzes that signal, and the selector 16 selects the output of the R-ACM 9 and gives the read address to the data memory 6, thereby reading out the STM signal.

The case of the time slots corresponding to the signals other than the STM signals is as follows. The output signal of the counter 12 corresponds to the output highway number. Therefore, when the output of the counter 12 has been given to the R-ACM 9, and the signal representing that the time slot of interest is not the time slot for the STM signal has been output from the R-ACM 9, the signal kind judging unit 22 analyzes that signal and the selector 16 selects the output of the selector 15. Then, the output signal of the counter 12 is given to the selector 15, and then the read register corresponding to the selected output highway is determined. Next, the read address is read out from the read register thus determined and then is given to the read address terminal of the data memory 6 through both the selectors 15 and 16. As a result, the ATM signal is read out to be output to the highway 3. The address which has been used as a read address at this time is returned to the idle address FIFO memory 10 and is utilized as a write address again. The address (the next address) which has been read out together with the ATM signal is newly stored in the read register which output the above-mentioned read address. Incidentally, in the case where there is no cell which is to be output to any output highway, the address which is stored in the empty cell address register 23 is selected. The contents of the data memory 6 corresponding to that address is always present as an empty cell.

Figure 8:
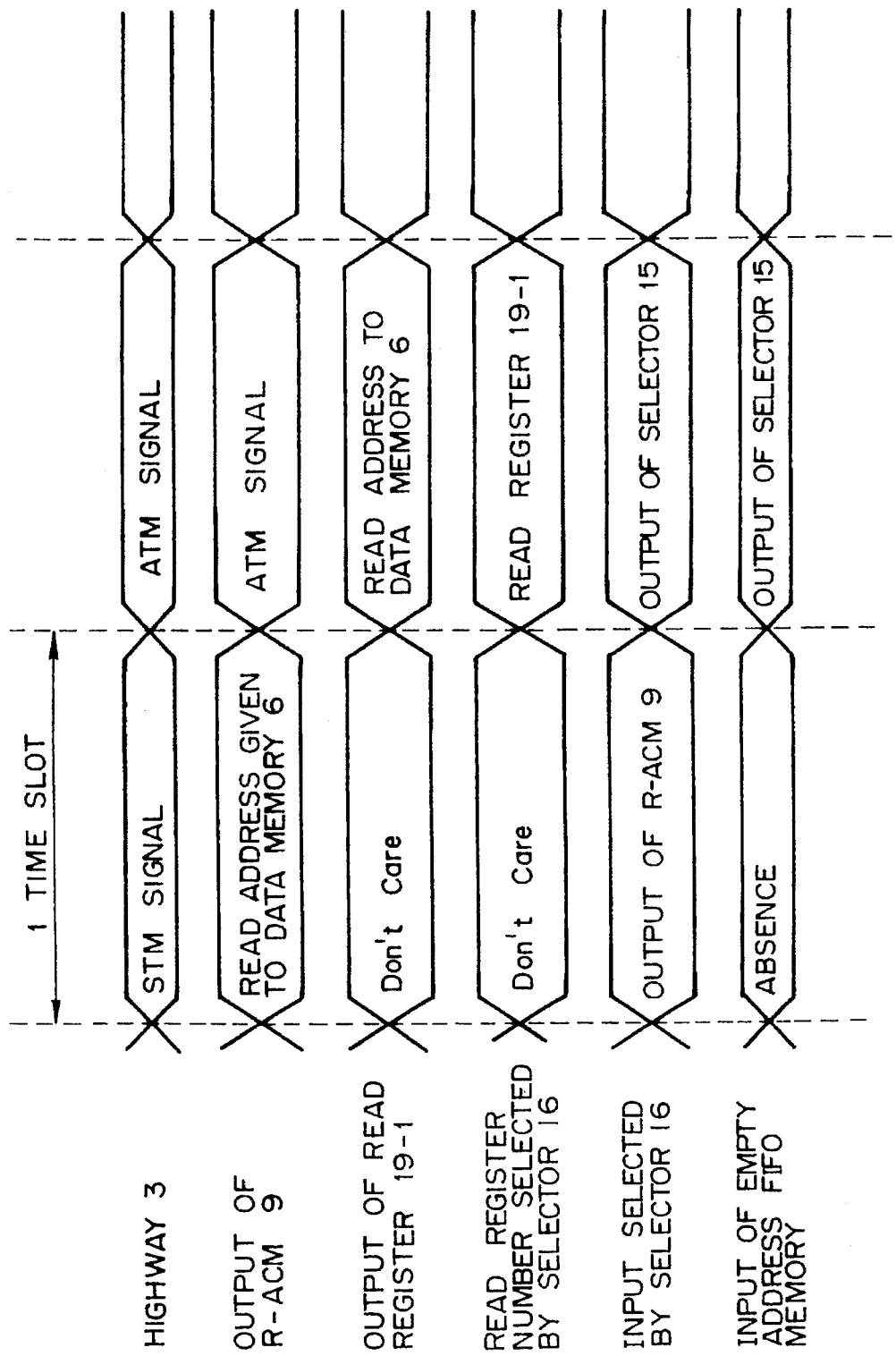
FIG. 8 is a timing chart (1) useful in explaining the operation of reading out the data from the data memory 6.

A timing chart of the reading operation is shown in FIG. 8. FIG. 8 shows the operation in the case where the STM signal and the ATM signal are successively output. In the figure, it is assumed that the ATM signal is output to the output highway 4-1. As shown in FIG. 8, in the case where the STM signal is output from the data memory 6, the output of the R-ACM 9 is given to the read address terminal of the data memory 6. On the other hand, in the case where the ATM signal is output from the data memory 6, the output of the read register (the read register 19-1 in the present embodiment) corresponding to the output highway (the output highway 4-1 in the present embodiment) which is to output the ATM signal of interest is given to the read address terminal of the data memory 6.

Figure 9:
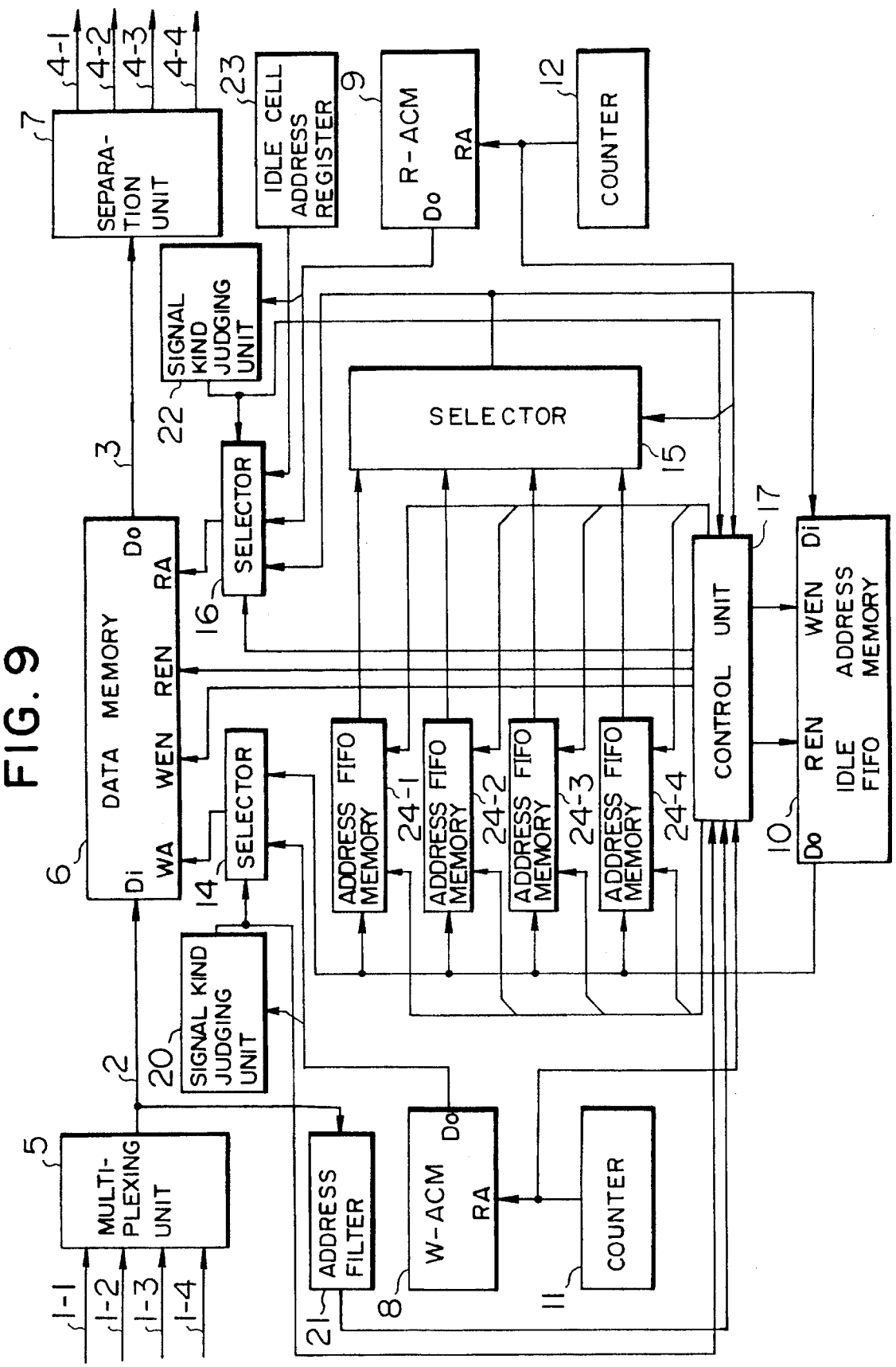
FIG. 9 is a functional block diagram showing a configuration of an a modification of the first embodiment of the present invention.

In addition, the above-mentioned switch can also be realized on the basis of a configuration shown in FIG. 9. FIG. 9 is a functional block diagram showing the configuration of the system in which the sets of the write registers and the read registers shown in FIG. 1 are replaced with memories 24-1 to 24-4 (hereinafter, referred to as "address FIFO memories", when applicable). Those address FIFO memories 24-1 to 24-4 correspond to the output highways 4-1 to 4-4, respectively.

In the present applied example, the method of processing the STM signals is the same as that shown in FIG. 1.

Next, the description will hereinbelow be given first of all with respect to the write side processing out of the processings of the ATM signals. In the case where the ATM signal is written to the data memory 6, first, the idle address is read out from the idle address FIFO memory 10 and then is given to the data memory 6, thereby writing the ATM signal thereto. In addition, that idle address is written to the address FIFO memory corresponding to the output highway which is to output the ATM signal. A point of difference of the present applied example from the first embodiment shown in FIG. 1 is that address is not written to the data memory 6.

Figure 10:
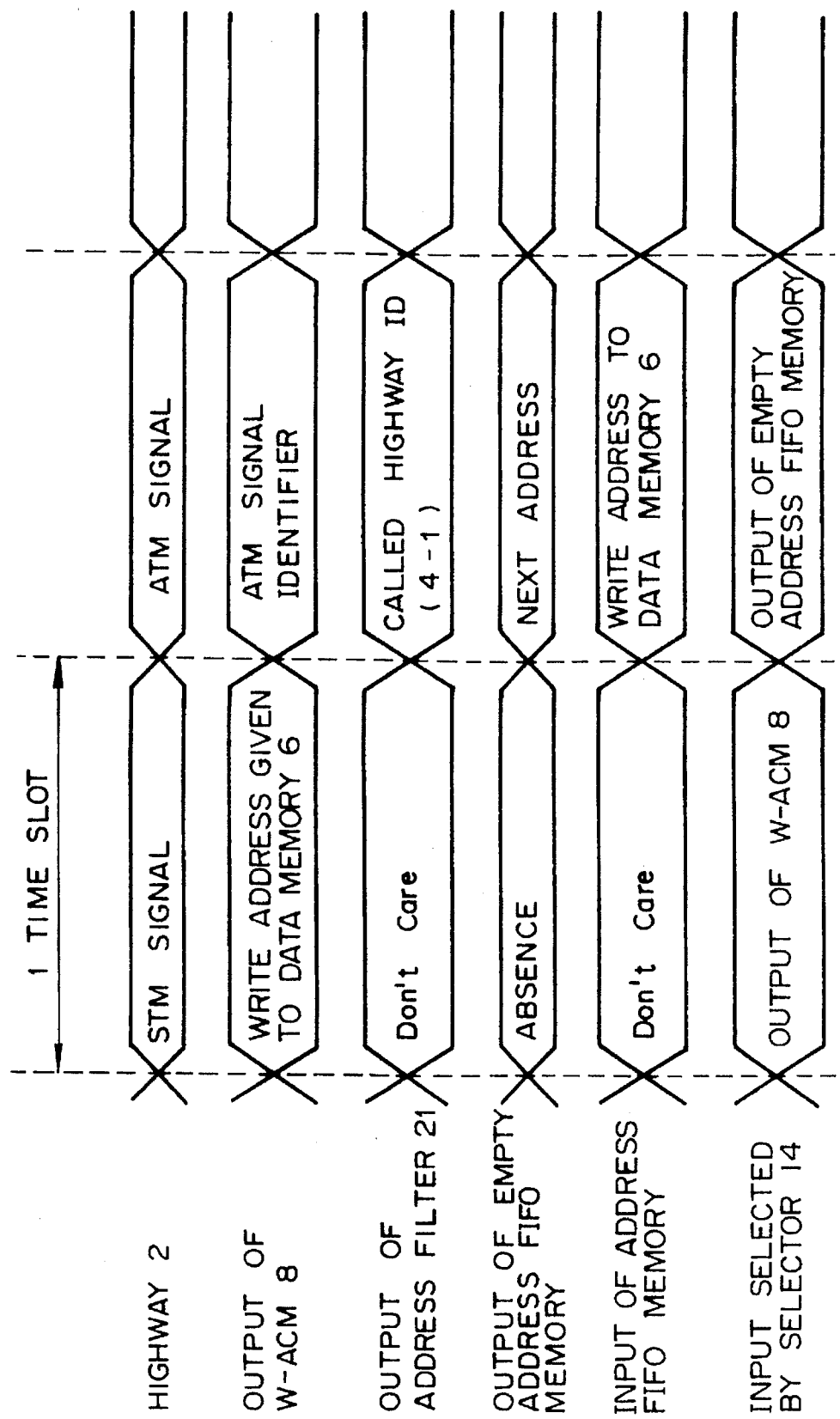
FIG. 10 is a timing chart (2) useful in explaining the operation of writing the data to the data memory 6.

A timing chart of the write side operation is shown in FIG. 10. FIG. 10 shows the operation in the case where the STM signal and the ATM signal arrive successively at the data memory 6. In the figure, it is assumed that the ATM signal is output to the output highway 4-1. As shown in FIG. 10, when the STM signal has arrived at the data memory 6, the output of the W-ACM 8 is given to the write address terminal of the data memory 6. On the other hand, when the ATM signal has arrived at the data memory 6, the output of the idle address FIFO memory 10 is given to the write address terminal of the data memory 6. Then, that address is also stored in the address FIFO memory (the address FIFO memory 24-1 in the present example) corresponding to the output highway (the output highway 4-1 in the present example) which is to output the ATM signal.

Next, the description will hereinbelow be given with respect to the read side operation. On the read side, in correspondence to the value of the counter 12, the output highway is determined. The control unit 17 selects the address FIFO memory corresponding to the output highway thus determined, and then reads out the address from the address FIFO memory thus selected. Next, the address thus read is given to the read address terminal of the data memory 6 via both the selectors 15 and 16, and then the ATM signal is read out from the data memory 6. Then, that address value is returned to the idle address FIFO memory 10 to be used to write the ATM signal again.

Figure 11:
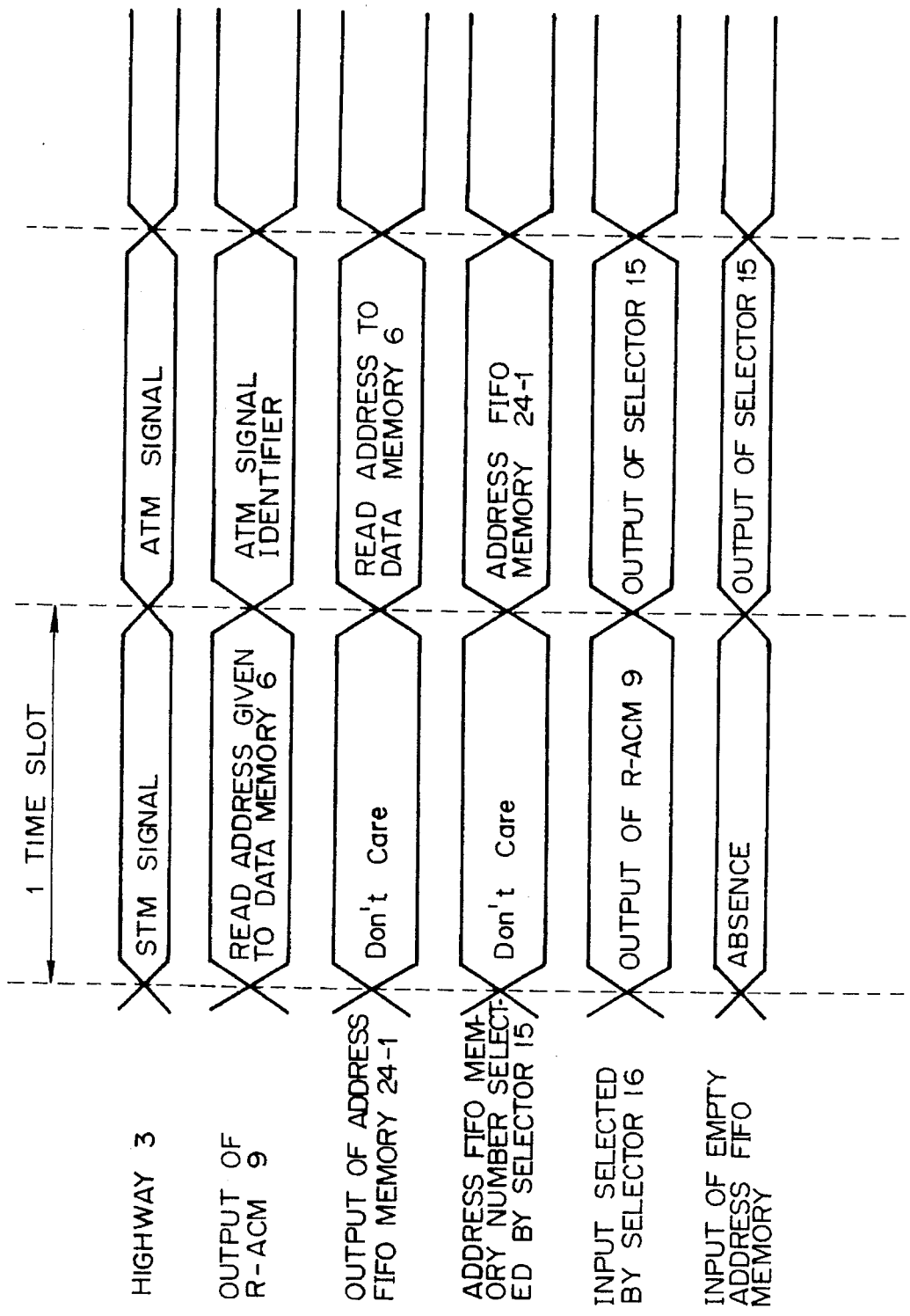
FIG. 11 is a timing chart (2) useful in explaining the operation of reading out the data from the data memory 6.

A timing chart of the read side operation is shown in FIG. 11. FIG. 11 shows the operation in the case where the STM signal and the ATM signal are successively output from the data memory 6. In the figure, it is assumed that the ATM signal is output to the output highway 4-1. As shown in FIG. 11, in the case where the STM signal is output from the data memory 6, the output of the R-ACM 9 is given to the read address terminal of the data memory 6. On the other hand, in the case where the ATM signal is output from the data memory 6, the output of the address FIFO memory (the address FIFO memory 24-1 in the present example) corresponding to the output highway (the output highway 4-1 in the present example) which is to output the ATM signal is given to the address terminal of the data memory 6.

Referring back to FIG. 5, after the switching processing has been completed in the switching unit 34, the STM signals and the ATM signals are sent to the STM transmitting interface units 31-1 and 31-2, and the ATM transmitting interface units 33-1 and 33-2, respectively, and then are output to the transmission lines.

The description will hereinbelow be given with respect to a second embodiment of the present invention. The signals which are used in the second embodiment of the present invention are the same as those which were used in the above-mentioned first embodiment of the present invention. FIG. 2 shows the form of the STM-1 signal which is determined in the CCITT recommendation G.707,708 and 709. This STM-1 signal includes the AU-4 Pointer. The STM-1 signal is in the state shown in FIG. 2 on the transmission line. Next, FIG. 3 shows the form of the ATM signal on the transmission line. In FIG. 3, there is shown the method of mapping the ATM signal on the STM-1 signal, and the ATM signal is transmitted in this state on the transmission line.

Next, a configuration of a switch in the second embodiment of the present invention is shown in FIG. 12. The switch shown in FIG. 12 is has four inputs and four outputs. The signals which have been input from the plurality of input highways are subjected to the time-division multiplexing in the multiplexing unit 5, the signals which have arrived at the data memory 6 are written to the data memory 6, and the signals thus written are then read out in a suitable order from the data memory 6 and then are separated in the separation unit 7 to be divided among the plurality of output highways, thereby carrying out the switching operation.

On the input side of the data memory 6, the counter 11 is provided, and the sets of two kinds of the registers (the write registers 18-1 to 18-4 and the read registers 19-1 to 19-4) corresponding to the associated output highways are provided by the same number (i.e., four sets) as that of the output highways. In addition, the data output of the idle address FIFO memory 10 is connected to the input terminals of the write registers 18-1 to 18-4 and the data input terminal of the data memory 6, the output terminals of the plurality of write registers 18-1 to 18-4 are connected to the selector 14 which operates to receive the destination output highway number of the arrived signal as the selective input, and the output of the counter 11 and the output of the selector 13 are connected to the write address terminal of the data memory 6 via the selector 14. In this connection, the write registers 18-1 to 18-4 correspond to the output highways 4-1 to 4-4, respectively. In addition, the read registers 19-1 to 19-4 correspond to the output highways 4-1 to 4-4, respectively.

On the other hand, on the output side of the data memory 6, the second memory (the address control memory: R-ACM) 9 is provided. In addition, the data output terminal of the data memory 6 is connected to the input terminals of the read registers 19-1 to 19-4, the output terminals of the plurality of read registers 19-1 to 19-4 are connected to the selector 15 which operates to receive, as the selective input, the output of the counter 12 which operates to generate the read timing for every output highway, the output of the selector 15 and the output of the R-ACM 9 are connected to the read address terminal of the data memory 6 through the selector 16, and the output of the selector 15 is also connected to the data input terminal of the idle address FIFO memory 10.

Figure 13A:
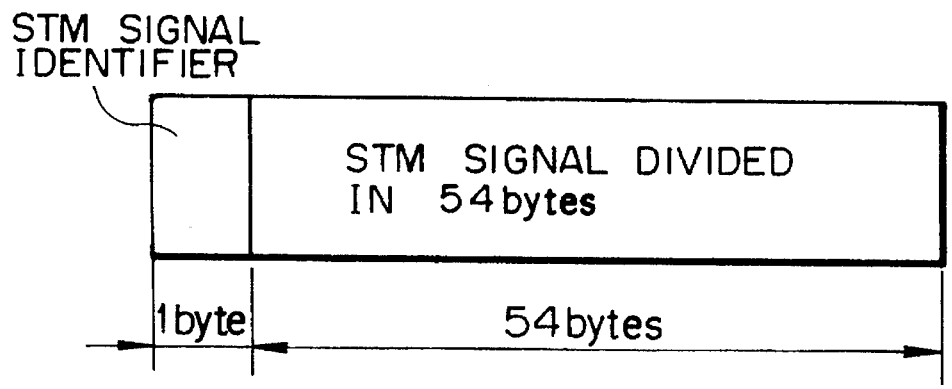
FIGS. 13A and 13B are diagrams showing the forms of the STM signal respectively and ATM signal in the system according to the second embodiment of the present invention.
Figure 13B:
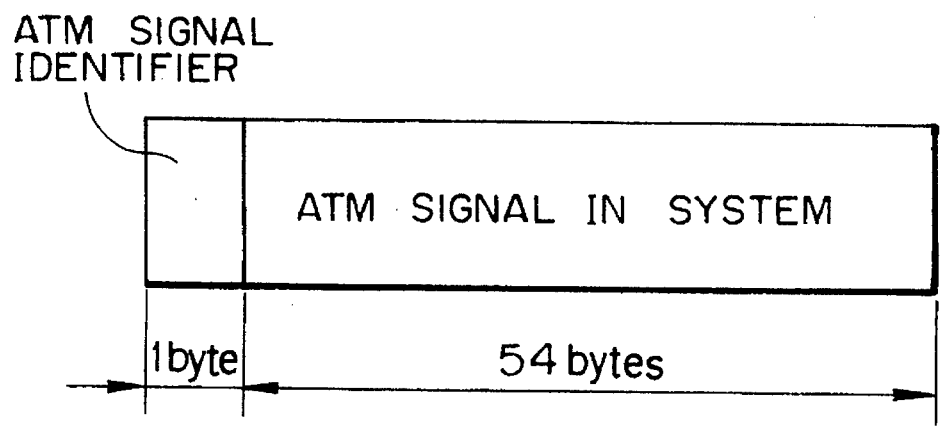

Next, the configuration of the system is shown in FIG. 5. In FIG. 5, the STM signals are respectively received by the STM receiving interface units 30-1 and 30-2 to be divided in 54 bytes. Then, the STM signal identifier is, as shown in FIG. 13A, added to each of the signals which have been obtained by the division. Then, the resultant signals are output to the switching unit 34. In addition, the ATM signals are respectively received in the state as shown in FIG. 3 by the ATM receiving interface units 32-1 and 32-2. In the ATM receiving interface units 32-1 and 32-2, each of the received signal is converted into the signal having the form as shown in FIG. 4. Next, the ATM signal identifier is, as shown in FIG. 13B, added to each of the resultant signals. Then, the resultant signals are output to the switching unit 34.

The switching unit 34 has the configuration shown in FIG. 12. First, the description will hereinbelow be given with respect to the operation of writing the data to the data memory 6. The STM signal appears periodically on the highway 2. Therefore, the address value which is given when writing the STM signal, which is to be transmitted in the time slot, to the data memory 6 in correspondence to the time slot on the highway 2 is made identical to the output of the counter 11. That is, if the output of the counter 11 at the time when the STM signal has arrived at the data memory 6 is 2, that STM signal will be stored in the address 2 in the data memory 6. The signal kind judging unit 20 checks the code which was added to the signal, whereby judging whether or not the signal corresponding to the time slot is the STM signal is determined.

In the case where the signals corresponding to the time slots are the signals other than the STM signals, the signal representing that the signal of interest is the ATM signal is output from the signal kind judging unit 20 to be given to the selector 14. Then, the selector 14 selects the output of the selector 13. In addition, the address filter 21 becomes active to check the header of the ATM signal. The data relating to the output highway to which the ATM signal is to be output (the output highway number) is recorded in the header of the ATM signal in each of the ATM receiving interface units 32-1 and 32-2. The address filter 21 checks this header portion of the ATM signal to determine to which output highway the ATM signal is to be output. The data relating to the output highway to which the ATM signal is to be output is transmitted to the control unit 17. Then, the control unit 17 obtains the write address which will be given from the write register corresponding to that output highway to the data memory 6. Now, the write address is previously input from the idle address FIFO memory to that write register. The control unit 17 reads out one idle address from the idle address FIFO memory 10, and then stores that one idle address together with the ATM signal in the data memory 6. In addition, the control unit 17 also writes that one idle address to the write register corresponding to the output highway which is to output the ATM signal to update the contents of that write register. Incidentally, in the case where the ATM signal corresponds to the idle cell or the idle address FIFO memory 10 is empty, no data is written to the data memory 6.

Figure 14:
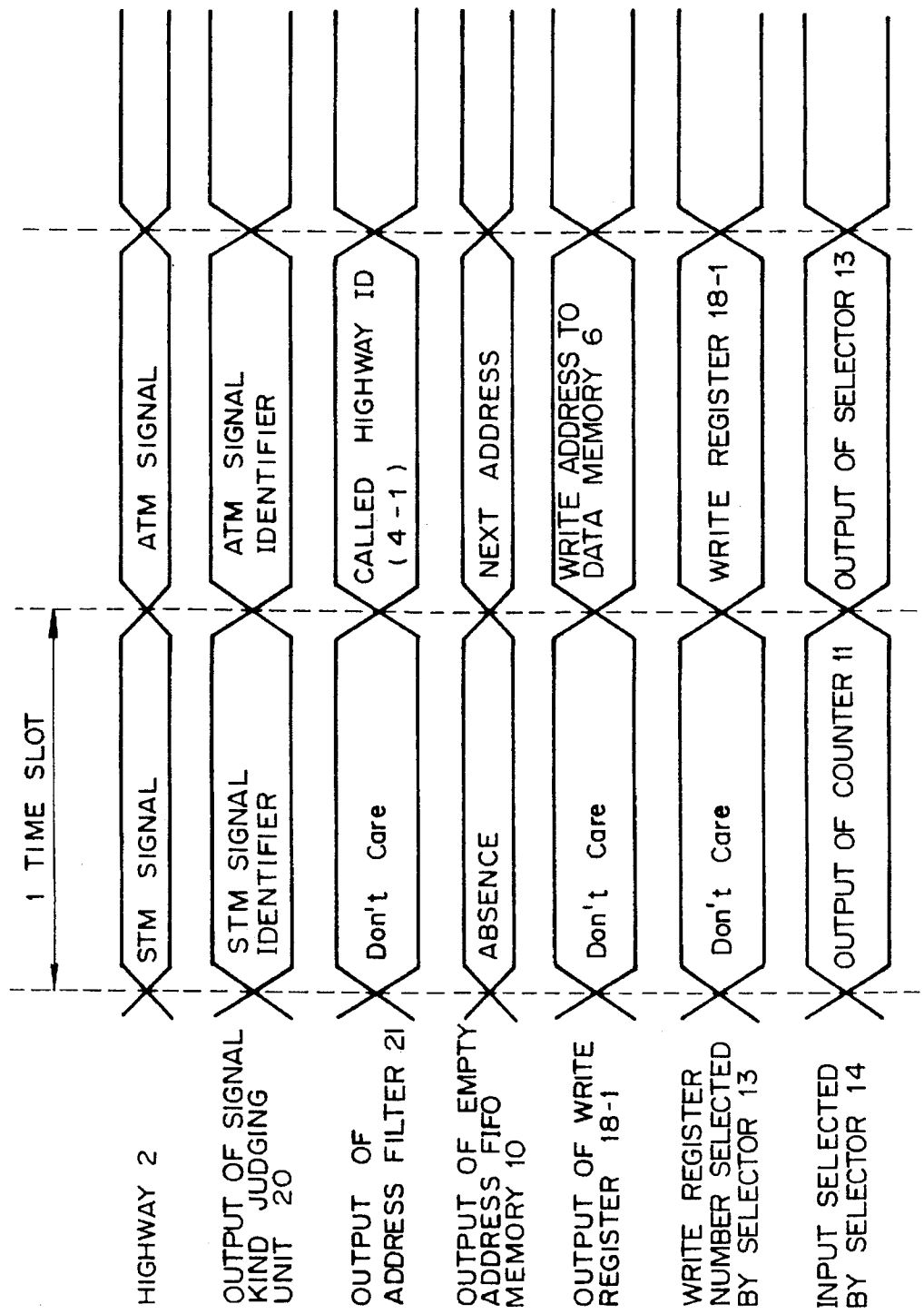
FIG. 14 is a timing chart (3) useful in explaining the operation of writing the data to the data memory 6.

A timing chart of the write side operation is shown in FIG. 14. FIG. 14 shows the operation in the case where the STM signal and the ATM signal arrive successively at the data memory 6. In the figure, it is assumed that the ATM signal is output to the output highway 4-1. As shown in FIG. 14, when the STM signal has arrived at the data memory 6, the output of the counter II is given to the write address terminal of the data memory 6. On the other hand, when the ATM signal has arrived at the data memory 6, the output of the write register (the write register 18-1 in the present embodiment) corresponding to the output highway (the output highway 4-1 in the present embodiment) which is to output the ATM signal is given to the write address terminal of the data memory 6.

Next, the description will hereinbelow be given with respect to the reading operation. On the read side, the counter 12 reads out the read address from the R-ACM 9 in correspondence to the time slot of the output highway. The R-ACM 9 has the same configuration as that shown in the above-mentioned first embodiment. That is, in the case where the STM signal is output to the time slot, the address in the data memory 6 is previously stored. In the case where the signal of interest is the STM signal, the signal kind judging unit 22 analyzes that signal, and the selector 16 selects the output of the R-ACM 9 and then gives the read address to the data memory 6, thereby reading out the STM signal.

The case of processing the time slots corresponding to the signals other than the STM signals is as follows. The output signal of the above-mentioned counter 12 corresponds to the output highway number. Therefore, when the output of the counter 12 has been given to the R-ACM 9 and the signal representing that the time slot of interest is not the time slot for the STM signal has been output from the signal kind judging unit 22, the selector 16 selects the output of the selector 15. Then, the output signal of the counter 12 is given to the selector 15, and the read register corresponding to the selected output highway is determined. Next, the control unit 17 reads out the read address from the read register thus determined and then gives that read address to the read address terminal of the data memory 6 via both the selectors 15 and 16. As a result, the ATM signal is read out to be output to the highway 3. The address which has been used as the read address at this time is returned to the idle address FIFO memory 10 and then is utilized as the write address again. The address (the next address) which has been read out together with the ATM signal is stored in the read register corresponding to the output highway which output the ATM signal. Incidentally, in the specific case where there is no cell which is to be output to a certain output highway, the address which is stored in the empty cell address register 23 is selected. The contents of the data memory 6 corresponding to that address is always present as the empty cell.

A timing chart of the read side operation is shown in FIG. 8. FIG. 8 shows the operation in the case where the STM signal and the ATM signal are successively output from the data memory 6. In the figure, it is assumed that the ATM signal is output to the output highway 4-1. As shown in FIG. 8, in the case where the STM signal is output from the data memory 6, the output of the R-ACM 9 is given to the read address terminal of the data memory 6. On the other hand, in the case where the ATM signal is output from the data memory 6, the output of the read register (the read register 19-1 in the present embodiment) corresponding to the output highway (the output highway 4-1 in the present embodiment) which is to output the ATM signal of interest is given to the read address terminal of the data memory 6.

Both the STM signal identifier and the ATM signal identifier are added to the signal in the present embodiment. However, the system for transmitting those identifiers through a separate line or lines can also be readily realized.

Figure 15:
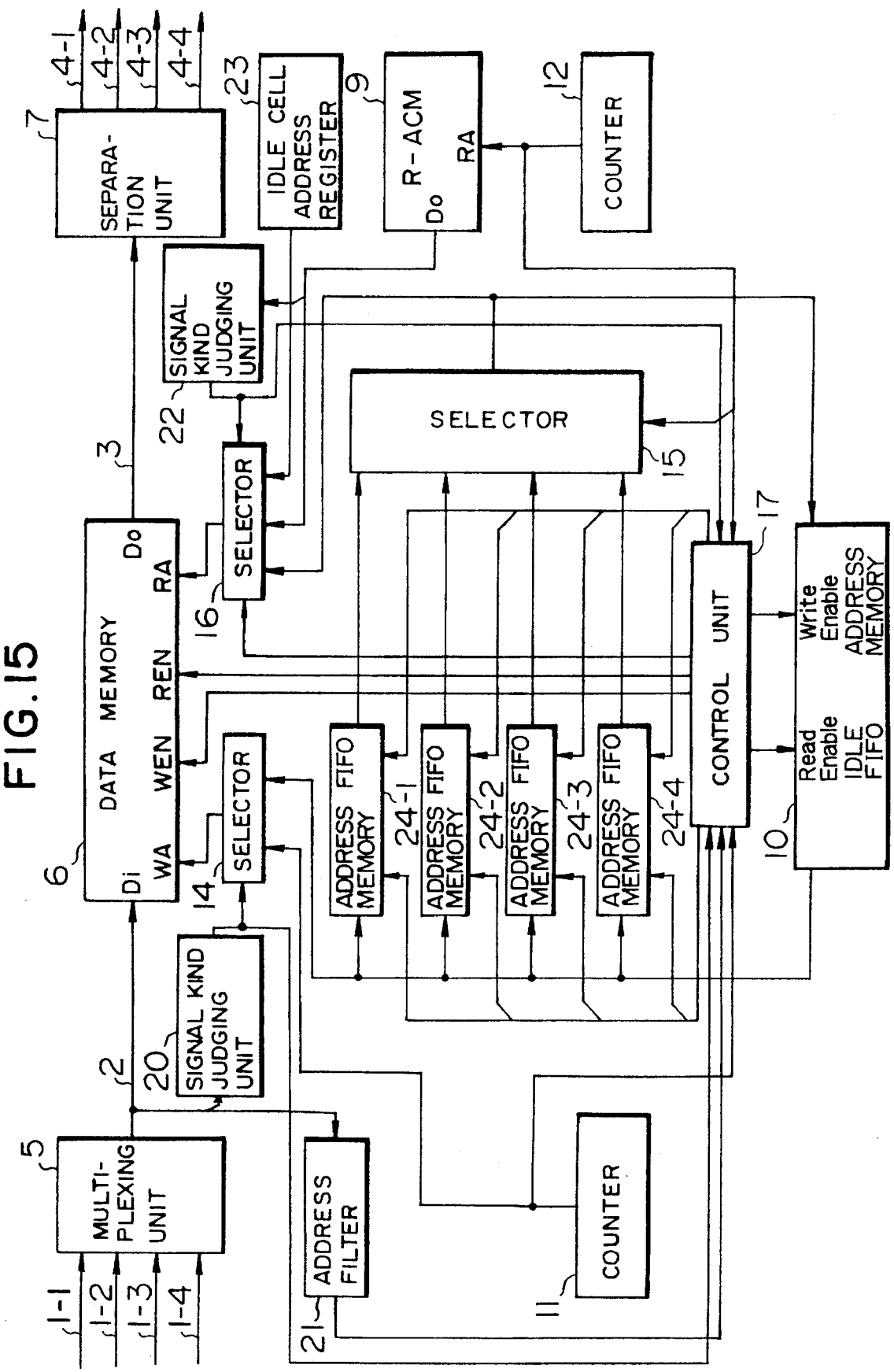
FIG. 15 is a functional block diagram showing a configuration of a modification of the second embodiment of the present invention.

In addition, the above-mentioned switch can also be realized on the basis of the configuration shown in FIG. 15. FIG. 15 is a functional block diagram showing a configuration of an applied example of the second embodiment of the present invention in which the sets of the write registers and the read registers shown in FIG. 12 are replaced with memories 24-1 to 24-4 (hereinafter, referred to as "address FIFO memories", when applicable). Those address FIFO memories correspond to the output highways 4-1 to 4-4, respectively.

The method of processing the STM signals in the present applied example is the same as that shown in FIG. 12.

Next, the description will hereinbelow be given first of all with respect to the write side processing out of the processings of the ATM signals. In the case where the ATM signal is written to the data memory 6, first, the idle address is read out from the idle address FIFO memory 10 and then is given to the data memory 6, thereby writing the ATM signal. In addition, that idle address is written to the address FIFO memory corresponding to the output highway which is to output the ATM signal. A point of difference of the present example from the second embodiment shown in FIG. 12 is that address is not written to the data memory 6.

A timing chart of the write side operation is shown in FIG. 16. FIG. 16 shows the operation in the case where the STM signal and the ATM signal arrive successively at the data memory 6. In the figure, it is assumed that the ATM signal is output to the output highway 4-1. As shown in FIG. 16, when the STM signal has arrived at the data memory 6, the output of the counter 11 is given to the write address terminal of the data memory 6. On the other hand, when the ATM signal has arrived at the data memory 6, the output of the idle address FIFO memory 10 is given to the write address terminal of the data memory 6. Then, that address is also stored in the address FIFO memory (the address FIFO memory 24-1 in the present example) corresponding to the output highway (the output highway 4-1 in the present example) which is to output the ATM signal.

Next, the description will hereinbelow be given with respect to the read side operation. On the read side, the output highway is determined in correspondence to the value of the counter 12. The control unit 17 selects the address FIFO memory corresponding to the output highway thus determined, and then reads out the address from that address FIFO memory. Next, the control unit 17 gives the address thus read to the read address terminal of the data memory 6 via both the selectors 15 and 16 and then reads out the ATM signal. Then, the address value is returned to the idle address FIFO memory 10 to be used for the writing operation again.

A timing chart of the read side operation is shown in FIG. 11. FIG. 11 shows the operation in the case where the STM signal and the ATM signal are successively output from the data memory 6. In the figure, it is assumed that the ATM signal is output to the output highway 4-1. As shown in FIG. 11, in the case where the STM signal is output from the data memory 6, the output of the R-ACM 9 is given to the read address terminal of the data memory 6. On the other hand, in the case where the ATM signal is output from the data memory 6, the output of the address FIFO memory (the address FIFO memory 24-1 in the present example) corresponding to the output highway (the output highway 4-1 in the present example) which is to output the ATM signal is given to the read address terminal of the data memory 6.

Referring back to FIG. 5, after the switching processing has been completed in the switching unit 34, the STM signals and the ATM signals are sent to the STM transmitting interface units 31-1 and 31-2 and the ATM transmitting interface units 33-1 and 33-2, respectively, and then are output to the transmission lines.

As set forth hereinabove, according to the present invention, the two kinds of the STM signal and the ATM signal can be managed with the single switch, and therefore, the cost can be effectively reduced.

What is claimed is:

1. In a switch for writing signals input from input highways to a first memory and reading out the signals from said first memory to output highways, a method of processing inclusively synchronous transfer mode signals (hereinafter, referred to as "STM signals", when applicable) and asynchronous transfer mode signals (hereinafter, referred to as "ATM signals", when applicable), comprising the steps of:

in the case where an input signal is an STM signal, the STM signal of interest is written to said first memory in accordance with an address generated by an address generating means, and the STM signal of interest is read out from said first memory in accordance with an address value stored in a second memory; and in the case where an input signal is an ATM signal, an address value is obtained from a third memory which stores address value of an empty area in said first memory, and the ATM signal of interest is written to said first memory in accordance with the address value of interest, and in the case where the ATM signal of interest is read out from said first memory; the address valves of an empty area in said first memory in which the ATM signal of interest was stored is written into said third memory.

2. A method according to claim 1, wherein a set of the address values which are to be given to the STM signals and a set of the address values which are to be given to the ATM signals are exclusive each other at an arbitrary time.

3. A method according to claim 1, wherein said address generating means is a memory.

4. A method according to claim 1, wherein said address generating means is a counter.

5. A method according to claim 1, wherein each of said first, second and third memories is a semiconductor memory.

6. A switching system in which STM signals and ATM signals (fixed length cells each consisting of a header portion and an information portion) are inclusively present on input highways and output highways, comprising:

a multiplexing circuit for subjecting the signals input from the plurality of input highways to the time-division multiplexing;

a data memory for storing signals received from said input highways, when a signal received from an input highway is the STM signal, that received signal is stored; and when a signal received from an input highway is ATM signal, both the received ATM signal and an address (a next address) to be used to write an ATM signal, which will arrive next to said arrived ATM signal and go to the same output highway as that said arrived ATM signal goes, are stored thereat in a set;

a demultiplexing circuit for demultiplexing output signals from said data memory among the output highways;

an idle address FIFO memory for storing an address (an idle address) of an empty area in said data memory;

a first signal kind judging circuit for judging the signal kind (the STM signal or ATM signal) of the signal which has arrived at said data memory;

a circuit for generating a write address for the STM signal which operates to generate, when the STM signal has arrived, a write address to said data memory;

a first counter for generating a write timing for the arrived signal;

an address filter coupled to said multiplexing circuit for checking, when the ATM signal has arrived, the output highway to which the ATM signal is to be output on the basis of the header information of the ATM signal;

a plurality of write registers coupled to said idle address FIFO memory for storing the write addresses of the ATM signals which are to be output to the associated output highways; a first selector coupled to said write registers for selecting one of the outputs of said plurality of write registers;

a second selector coupled to said first selector, said first signal kind judging circuit and said data memory for becoming aware of the signal kind of the arrived signal on the basis of an output of said first signal kind judging circuit; and selecting, if the received signal is the STM signal, an output of said circuit for generating a write address for the STM signal, and selecting, if the received signal is the ATM signal, an output of said first selector, and giving the selected input to a write address terminal of said data memory;

a second counter for generating a read timing, in which the data is to be read out from said data memory, for every output highway;

an address control memory for storing, if a time slot is used for the STM signal, a read address at every time slot of the output highway, and storing, if the time slot is not used for the STM signal, an ATM signal output designator and using an output of said second counter as a read address;

a second signal kind judging circuit for judging the signal kind of the signal output from said data memory on the basis of an output of said address control memory;

a plurality of read registers for storing the read addresses for the ATM signals for the output highways corresponding thereto;

a third selector for selecting an output of one of said plurality of read registers in accordance with the output of said second counter, and giving the selected output to said idle address FIFO memory and a data input terminal of a fourth selector;

said fourth selector for becoming aware of the signal kind of the signal output from said data memory on the basis of an output of said second signal kind judging circuit, and selecting, if the output signal is the STM signal, the output of said address control memory, and selecting, if the output signal is the ATM signal, an output of said third selector, and giving the selected input to a read address terminal of said data memory; and a control unit for becoming aware of the output highway to which the arrived ATM signal is to be output on the basis of an output of said address filter, selecting the write register corresponding to the called output highway out of said plurality of write registers, making said first selector select the write register of interest, next, reading out an idle address from said idle address FIFO memory, storing the idle address in the selected write register of interest and storing the idle address, together with the arrived ATM signal, in said data memory, storing the read address given to said data memory in said idle address FIFO memory, and writing the read next address, together with the ATM signal, in the read register which stored the read address of interest.

7. A switching system according to claim 6, wherein a set of the address values which are to be given to the STM signals and a set of the address values which are to be given to the ATM signals are exclusive of each other at an arbitrary time.

8. A switching system according to claim 6, wherein said circuit for generating a write address for the STM signal includes a memory for holding a write address, wherein the addresses each of which is used to write the received STM signal to said data memory are stored in said write address holding memory.

9. A switching system according to claim 8, wherein in a stage before said switching system, includes a means for adding an identifier which represents the signal kind (the ATM signal or STM signal) of the signal of interest to the signal of interest, and wherein said first signal kind judging circuit which is provided on the input side of the data memory is includes a circuit for recognizing the identifier added to the signal of interest in said switching system.

10. A switching system according to claim 8, wherein an identifier circuit connected to said switching system produces an identifier which represents the signal kind (the ATM signal or STM signal) of the signal of interest is produced, and in the case where the identifier is transmitted to said switching system from said identifier circuit connected to said switching system, said first signal kind judging circuit which is provided on the input side of said data memory is a circuit for recognizing the identifier which has been transmitted from said circuit connected to said switching system.

11. A switching system according to claim 6, wherein said circuit for generating a write address for the STM signal is a counter.

12. A switching system according to claim 11, wherein said counter used as said circuit for generating a write address for the STM signal is identical to said first counter.

13. A switching system according to claim 6, wherein a signal length of the ATM signal in one time slot is the same as that of the STM signal.

14. A switching system according to claim 13, wherein the signal length is 54 bytes.

* * * * *